(12) United States Patent
Liu et al.

(10) Patent No.: US 12,510,456 B1
(45) Date of Patent: Dec. 30, 2025

(54) METHOD AND DEVICE FOR MAKING PHYSICAL FAULT MODEL AND EMPIRICALLY EVALUATING SEALING PERFORMANCE

(71) Applicant: Institute of Rock and Soil Mechanics, the Chinese Academy of Sciences, Wuhan (CN)

(72) Inventors: Hejuan Liu, Wuhan (CN); Weimin Wang, Wuhan (CN); Chunhe Yang, Wuhan (CN); Haijun Mao, Wuhan (CN); Yintong Guo, Wuhan (CN); Xiaosong Qiu, Wuhan (CN); Mancang Liu, Wuhan (CN); Shengnan Ban, Wuhan (CN)

(73) Assignee: Institute of Rock and Soil Mechanics, the Chinese Academy of Sciences, Wuhan (CN)

( * ) Notice: Subject to any disclaimer, the term of this patent is extended or adjusted under 35 U.S.C. 154(b) by 0 days.

(21) Appl. No.: 19/003,586

(22) Filed: Dec. 27, 2024

(30) Foreign Application Priority Data

Dec. 27, 2023 (CN) .......................... 202311822939.1

(51) Int. Cl.
*G01N 15/08* (2006.01)
*G01N 1/28* (2006.01)
*G01N 1/36* (2006.01)

(52) U.S. Cl.
CPC ....... *G01N 15/0826* (2013.01); *G01N 1/2806* (2013.01); *G01N 1/286* (2013.01); *G01N 15/0806* (2013.01); *G01N 2001/366* (2013.01)

(58) Field of Classification Search
CPC .. G01N 15/0826; G01N 1/2806; G01N 1/286; G01N 15/0806; G01N 2001/366
USPC ............................................. 73/38
See application file for complete search history.

(56) References Cited

U.S. PATENT DOCUMENTS

2021/0096277 A1* 4/2021 Zaki ................. E21B 47/06
2023/0383648 A1 11/2023 Liu et al.

FOREIGN PATENT DOCUMENTS

| CN | 104634637 A | * | 5/2015 | |
|---|---|---|---|---|
| CN | 107975362 A | | 5/2018 | |
| CN | 109520897 A | | 3/2019 | |
| CN | 110516977 A | * | 11/2019 | ............. E21F 17/16 |

(Continued)

*Primary Examiner* — Marrit Eyassu
(74) *Attorney, Agent, or Firm* — George D. Morgan

(57) ABSTRACT

The application discloses a method and device for making a physical fault model and empirically evaluating its sealing performance. The method comprises S1 preparing a fault filling zone model; S2 testing the initial permeability of the fault filling zone model before sealing it with nano-microsphere infused slurry; S3 placing the fault filling zone model into reservoir rocks, drilling slurry injection wellbores in the reservoir rocks on both sides of the fault filling zone model, and creating a perforation section near the bottom of the slurry injection wellbore directed towards the fault filling zone model; subsequently, injecting nano-microsphere infused slurry into the slurry injection wellbore to perform a sealing experiment; S4 taking out the fault filling zone model after the slurrying process in S3 and repeating S2 to test the permeability of the model after sealing; and S5 calculating the sealing performance index of the fault filling zone model.

4 Claims, 7 Drawing Sheets

(56) References Cited

FOREIGN PATENT DOCUMENTS

| | | | | | |
|---|---|---|---|---|---|
| CN | 114034622 A | * | 2/2022 | ........... | G01N 15/082 |
| CN | 116413184 A | | 7/2023 | | |

* cited by examiner

METHOD AND DEVICE FOR MAKING PHYSICAL FAULT MODEL AND EMPIRICALLY EVALUATING SEALING PERFORMANCE

CROSS-REFERENCE TO RELATED APPLICATIONS

The application claims priority to Chinese patent application No. 2023118229391, filed on Dec. 27, 2023, the entire contents of which are incorporated herein by reference.

TECHNICAL FIELD

The present application relates to the technical field of underground gas storages, in particular to a method and device for making a physical fault model and empirically evaluating its sealing performance.

BACKGROUND

There are faults of different scales in the construction area of underground gas storages in China, which pose a security threat to the long-term sealing performance of geological bodies of an underground gas storage. Consequently, employing sealing technology to manage faults with high leakage potential is of utmost importance. At present, evaluation methods for fault sealing primarily include lithological connections, mudstone smearing or the use of fault opening index (FOI). However, each of these methods has limitations. Among them, it is difficult to quantify the lithological connection, resulting in low accuracy. The mudstone smearing method can lead to multiple solutions and is inappropriate for evaluating the sealing of long-term active faults. In contrast, quantitative characterization methods such as FOI present challenges in parameter acquisition and operational issues. Moreover, these methods highly depend on drilling data. Therefore, there is an urgent requirement for a user-friendly laboratory evaluation method.

SUMMARY

To address the technical problem in repairing faults with a high leakage risk in an underground gas storage, the embodiments of this application propose a method and device for making a physical fault model and empirically evaluating its sealing performance, which serves as a foundation for designing effective fault sealing solution for underground gas storage projects. The technical solution is as described below.

A first aspect of the present application provides a method for making a physical fault model and empirically evaluating its sealing performance. This method includes:

S1. preparing a fault filling zone model using a sample-making mold;

S2. using a permeability testing apparatus to examine the initial permeability Ky of the fault filling zone model prior to sealing with a nano-microsphere infused slurry;

S3. placing the fault filling zone model into reservoir rocks, drilling slurry injection wellbores in the reservoir rocks on both sides of the fault filling zone model, creating a perforation section near a bottom of the slurry injection wellbore directed towards the fault filling zone model, and injecting the nano-microsphere infused slurry into the slurry injection wellbore to perform a sealing experiment utilizing a nano-microsphere slurrying experimental system;

S4. extracting the fault filling zone model after the slurrying process in the S3, and repeating the S2 to measure the permeability $K_2$ of the model after sealing; and S5. calculating the sealing performance index $\eta$ of the fault filling zone model using the following equation:

$$\eta = \frac{K_1 - K_2}{K_1} \times 100\%.$$

For instance, in the method for making a physical fault model and empirically evaluating its sealing performance provided by an embodiment, preparing the fault filling zone model in the S1 comprises:

S1.1 collecting a filler from a fault zone at the site and determining its main physical parameters in a laboratory, comprising moisture content, composition, grain gradation, compactness and density;

S1.2 taking an appropriate amount of the fault zone filler, measuring its initial mass $m_0$, adding an appropriate amount of water to achieve a plastic state and measuring a mass $m_1$ of the fault zone filler after the addition of water;

S1.3 filling the fault zone filler into the sample-making mold to prepare a fault filling zone model, recording a mass $m_2$ of the sample-making mold, calculating a corresponding sample volume under the condition that the compactness remains unchanged, based on the compactness and moisture content of the fault zone filler measured in S1.1 so as to determine a compaction depth h, and recording a total mass $m_3$ of the fault zone filler and the sample-making mold once the compaction depth h is reached; and S1.4 drying the sample at a low temperature, continuously monitoring the mass of the sample during the drying process, and when the mass drops from $m_3$ to $m_0 + m_2$, stopping drying to complete the modeling of the fault filling zone.

For instance, in the method provided by an embodiment for making a physical fault model and empirically evaluating its sealing performance, testing the permeability of the fault filling zone model in the S2 comprises:

S2.1 installing permeability test caps at both the upper and lower ends of the fault filling zone model;

S2.2 connecting the fault filling zone model with permeability test caps installed to a permeability test device; and S2.3 maintaining a constant water flow rate during the test, recording data once the flow and pressure data at the upper and lower ends of the fault filling zone model are stabilized, and calculating an initial permeability K of the fault filling zone model prior to sealing it with a nano-microsphere infused slurry.

For instance, an embodiment provides a method for making a physical fault model and empirically evaluating its sealing performance, and the sealing experiment with a nano-microsphere infused slurry in the S3 comprises:

S3.1 preparing a nano-microsphere infused slurry: preparing polymer nano-microspheres with a particle diameter of 40-80 nm by an inverse microemulsion polymerization with acrylamide configured as monomers, and then adding water, as a solvent, to prepare the slurry containing the nano-microspheres;

S3.2 acquiring reservoir rocks from the site, drilling perforations at a center of the reservoir rocks to make a fault filling zone model that simulates a fault core, drilling a first monitoring well with a shallow buried depth in the fault core near an edge of the reservoir rocks and further a second monitoring well with a shallow buried depth within the reservoir rocks; drilling slurry injection wellbores within the reservoir rocks on both sides of the fault core, and creating a perforation section directed towards the fault core near the bottom of the slurry injection wellbore; injecting the nano-microsphere infused slurry into the slurry injection wellbore, and allowing the slurry to migrate through the perforation section towards the fault core;

S3.3 continuously monitoring the concentration of nano-microspheres in a liquid flowing from a first monitoring well 18 and a second monitoring well 19 using a liquid composition detector so as to quantify the mass of water and nano-microspheres retained within the rock mass during the slurrying process; when the concentration of nano-microspheres in a discharged liquid from the first monitoring well 18, the second monitoring well 19 and the reservoir rocks stabilizes, stopping the slurrying operation; and S3.4 stand still for 48 hours until the nano-microspheres are fully expanded, crystallized and polymerized.

For instance, the method for making a physical fault model and empirically evaluating its sealing performance as provided in an embodiment involves extracting the fault filling zone models both before and after the slurrying operation in the S3; the rocks in the reservoir are then subjected to a directional slice processing at specified intervals; a migration path and a precipitation position of the nano-microsphere infused slurry and a polymer distribution of nano-microspheres are observed by examining the substances and structural characteristics in thin casting sections of the rocks at different positions.

For instance, in the method for making a physical fault model and empirically evaluating its sealing performance as provided in an embodiment, a lateral distance between the slurry injection wellbore and the fault filling zone model, a slurry flow rate, a slurry flow volume and a concentration of nano-microspheres in a slurry during a sealing experiment with the nano-microsphere infused slurry in the S3 are adjusted; and this process is repeated from S3 to S5, allowing for the analysis of various factors affecting the fault sealing effectiveness.

A second aspect of the present application provides a device for making a physical fault model and empirically evaluating its sealing performance. The sample-making mold consists of a sleeve, a bottom cover and a squeeze rod. The sleeve is designed to hold the fault zone fillers and comprises two detachably connected sleeve columns. The bottom cover is detachably connected to a base of the sleeve. The squeeze rod comprises a rod body and a squeeze disc attached to one end of the rod body, with the squeeze disc designed to fit an inner diameter of the sleeve.

For instance, in the device designed for making a physical fault model and empirically evaluating its sealing performance as provided by an embodiment, the permeability test device comprises permeability test caps that are detachably connected to both the upper and lower ends of the sleeve. One side of each permeability test cap is provided with a plurality of communicating grooves, with each groove containing several spaced water leakage holes; in which, both ends of the sleeve, which is filled with the fault filling zone model, are connected to the permeability test caps to form a testing unit; one end of the testing unit is connected to a high-pressure constant-speed pump and a water tank through pipelines, while the other end of the testing unit is connected to a liquid collection container through additional pipelines; a flow sensor and a pressure sensor are installed on a water inlet pipeline and a water outlet pipeline at the upper and lower ends of the testing unit, respectively, and the flow sensor and the pressure sensor are connected to a screen display device through transmission lines.

For instance, in the device for making a physical fault model and empirically evaluating its sealing performance, as provided by an embodiment, the nano-microsphere slurrying experimental system comprises a rock bracket, wherein reservoir rocks are installed in the rock bracket, and water leakage holes are located at four corners and a center of the rock bracket; perforations are created at the center of the reservoir rocks for filling the of fault filling zone model to simulate a fault core; a first monitoring well, with a shallow buried depth, is drilled into the fault core near an edge of the reservoir rocks, while a second monitoring well, also with a shallow buried depth, is drilled within the reservoir rocks; slurry injection wellbores are drilled into the reservoir rocks on both sides of the fault core, and a perforation section is created towards the fault core near the bottom of the slurry injection wellbore; and the slurry injection wellbore is connected to a high-pressure constant-speed pump and a nano-microsphere slurry tank via pipelines; furthermore, the first monitoring well, the second monitoring well, water leakage holes at the four corners of the rock bracket, and the water leakage holes at the center of the rock bracket are each connected to independent liquid collectors through pipelines.

For instance, in the device for making a physical fault model and empirically evaluating its sealing performance provided by an embodiment, each of the liquid collectors is placed on a balance, and the concentration of nano-microspheres in the liquid collected by each liquid collector is measured using a liquid composition detector.

The method and device for making a physical fault model and empirically evaluating its sealing performance, as provided by some embodiments of the present application, offer several beneficial effects. Addressing the technical problem of repairing faults with a high leakage risk in an underground gas storage, this application proposes a laboratory evaluation method to assess the fault sealing effectiveness utilizing nano-microspheres. In the laboratory, sealing experiments involving the slurrying of nano-microspheres are carried out on a scaled reservoir and fault model. The permeabilities, $K_1$ and $K_2$, of the fault before and after sealing are measured, and the sealing rate is calculated to evaluate the sealing effectiveness. This approach provides technical support for the design of fault sealing solutions at an actual engineering scale and serves as a foundation for developing fault sealing strategies for underground gas storage projects.

BRIEF DESCRIPTION OF DRAWINGS

A brief introduction is made below to the drawings necessary for the description of the embodiment or the prior art to illustrate the technical solution in the embodiments of the present specification more clearly. Apparently, the figures in the following description are only some embodiments of the present application, and those of ordinary skill in the art can derive other drawings from these drawings without creative work.

DETAILED DESCRIPTION OF THE EMBODIMENTS

The technical solutions in the embodiments of the present application will be comprehensively and completely described below with reference to the drawings in the embodiments of the present application. Evidently, the embodiments described are merely a part of, not all, the embodiments in the present application. All other embodiments, derived by an individual with ordinary skill in the art without the need for inventive labor, fall within the protective scope of this application.

Unless otherwise specified, all technical or scientific terms used herein are to be understood by those of ordinary skill in the relevant art. The terms "first," "second," and similar labels do not denote any specific order, quantity, or importance, but are merely employed to distinguish between different components. Terms like "comprises" or "comprising" indicate that the element or thing preceding the word comprises the element or thing enumerated after the word and its equivalent, but does not exclude other elements or things. Similar phrases such as "connected to" or "connected with" are not limited to physical or mechanical connection, but can include electrical connection, whether direct or indirect. "Up", "down", "left" and "right" are only used to indicate the relative position relationship. When the absolute position of the described object changes, the relative position relationship may also change accordingly.

Figure 1:
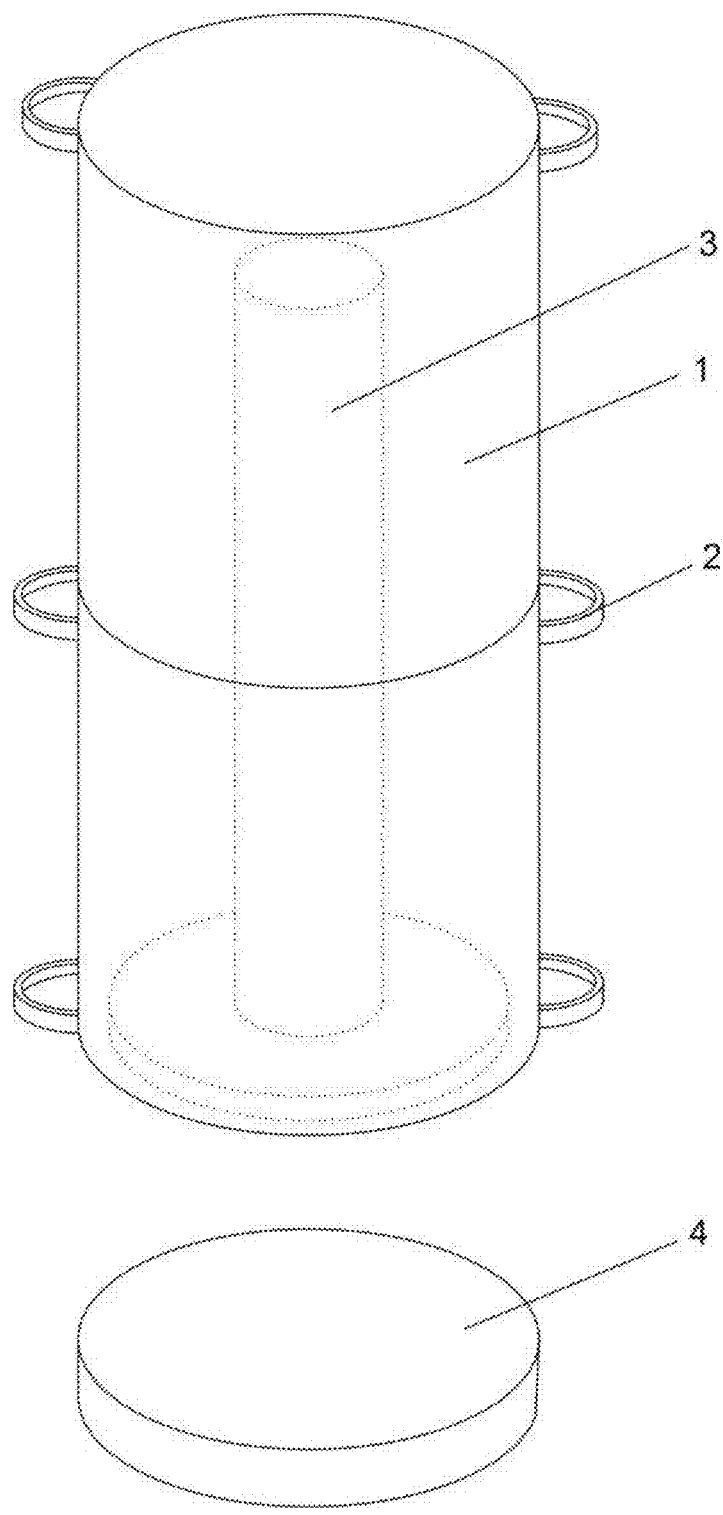
FIG. 1 is a structural schematic diagram of a sample-making mold according to the present application.

A first aspect of the present application provides a device for making a physical fault model and empirically evaluating its sealing performance. In which, the sample-making mold, as shown in FIG. 1, consists of a sleeve 1, a bottom cover 4, and a squeeze rod 3. The sleeve 1 is designed to hold the fault zone fillers and comprises two detachably connected sleeve columns. The bottom cover 4 is detachably connected to a base of the sleeve 1. The squeeze rod 3 comprises a rod body and a squeeze disc attached to one end of the rod body, with the squeeze disc designed to fit an inner diameter of the sleeve.

Specifically, as shown in FIG. 1, the sample-making mold consists of two sleeves 1 with an inner diameter of 25 mm, a height of 50 mm, and a wall thickness of 2 mm, a bottom cover 4 with a diameter of 29 mm, and a squeeze rod 3 with a squeeze disc having a diameter of 25 mm at its front end. The two sleeve columns, as well as the sleeve column and the bottom cover 4, are connected by buckles 2.

Figure 2:
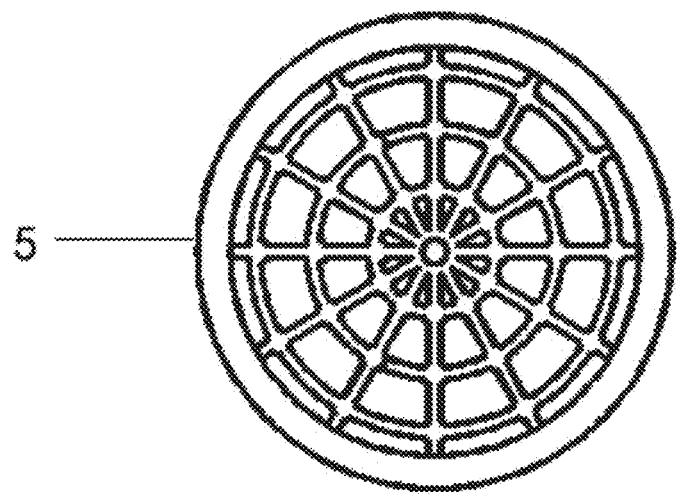
FIG. 2 is a structural schematic diagram of a permeability test cap according to the present application.

In the device designed for making a physical fault model and empirically evaluating its sealing performance according to the present application, the permeability test device comprises permeability test caps 5, as shown in FIG. 2. Each of the permeability test caps 5 is detachably connected to an upper and lower ends of the sleeve 1. One side of the permeability test cap 5 is provided with a plurality of communicating grooves, with each groove containing a series of water leakage through-holes at intervals.

Figure 3:
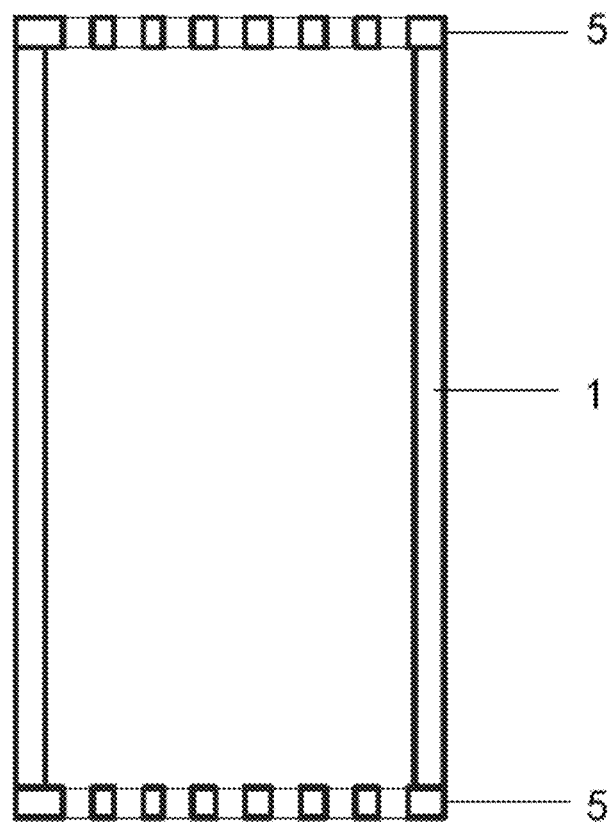
FIG. 3 is a structural schematic diagram of a connection state between the permeability test cap and the sleeve according to the present application.

Specifically, as shown in FIG. 3, the permeability test cap 5 is detachably connected to the upper and lower ends of the sleeve 1 via buckles 2. The diameter of the permeability test cap 5 is 29 mm, and it includes grooves with a depth of 0.5 mm and a width of 1 mm, arranged at intervals of 30° around the circumference. Each groove contains 7 evenly distributed round through-holes, each with a diameter of 1.5 mm. During the installation of the permeability test cap 5, the side with the groove notches should face inward. The installed sample is then placed on the permeability test device to initiate the permeability test.

Figure 4:
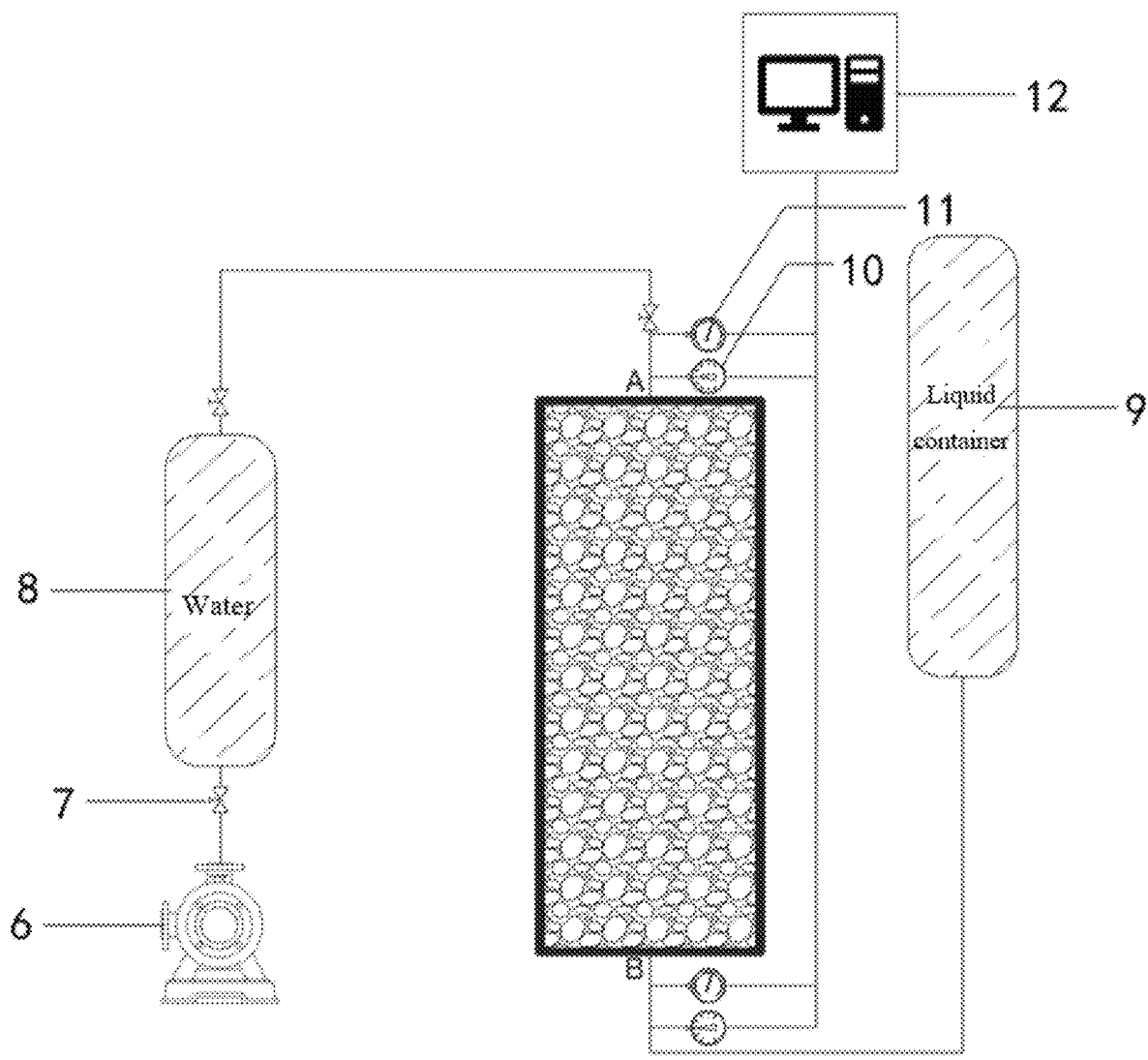
FIG. 4 is a schematic connection diagram of a permeability test device according to the present application.

For instance, in the device for making a physical fault model and empirically evaluating its sealing performance provided by an embodiment, as shown in FIG. 4, both ends of the sleeve, filled with a fault filling zone model, are connected to the permeability test cap to form a testing unit. One end of the testing unit is connected to a high-pressure constant-speed pump 6 and a water tank 8 via pipelines, while the other end of the testing unit is connected to a liquid collection container 9 through pipelines. A flow sensor 10 and a pressure sensor 11 are installed on the water inlet and outlet pipelines at the upper and lower ends of the testing unit, respectively. The flow sensor 10 and the pressure sensor 11 are connected to a screen display device 12 through transmission lines enabling real-time observation of dynamic data changes.

Figure 5:
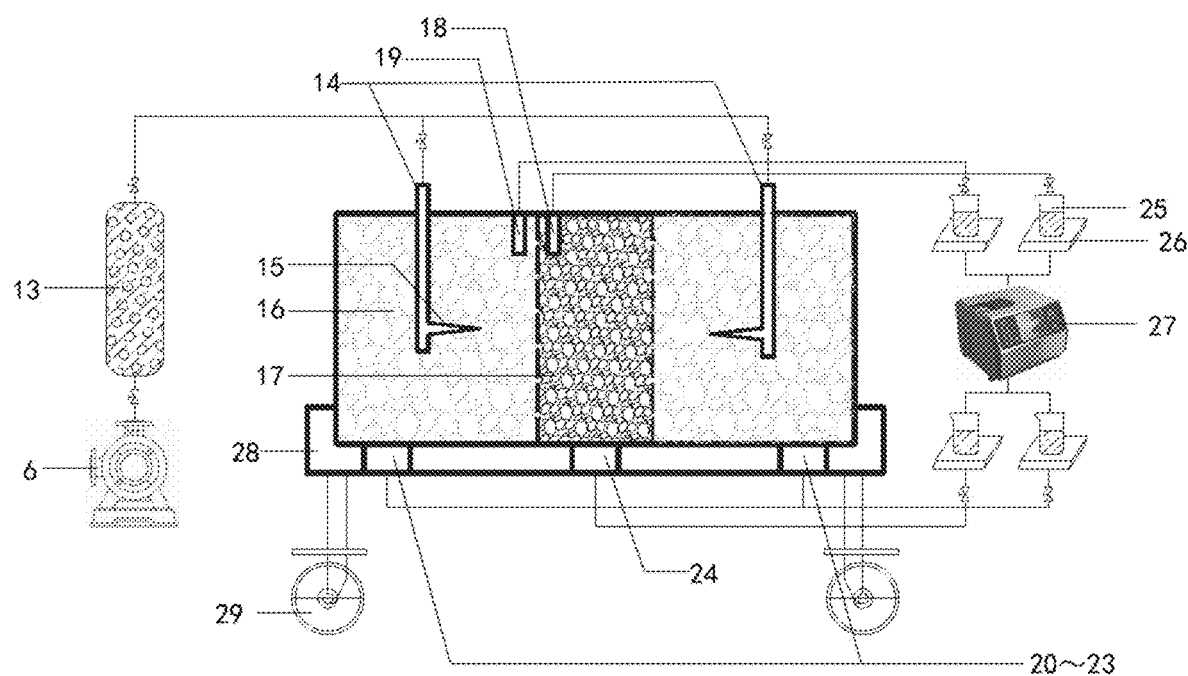
FIG. 5 is a schematic connection diagram of a nano-microsphere slurrying experimental system according to the present application.

For instance, the device for making a physical fault model and empirically evaluating its sealing performance, as provided by an embodiment, includes a nano-microsphere slurrying experimental system, as shown in FIG. 5. This system comprises a rock bracket 28, within which reservoir rocks 16 are installed. Water leakage holes 20-23 are located at four corners of the rock bracket 28 and a central water leakage hole 24 is arranged at the center of the rock bracket 28; perforations 17 are created at the center of the reservoir rocks 16 for filling the fault filling zone model to simulate a fault core. Additionally, a first monitoring well 18, with a shallow buried depth, is drilled into the fault core near an edge of the reservoir rocks, and a second monitoring well 19, also with a shallow buried depth, is drilled within the reservoir rocks. Slurry injection wellbores 14 are drilled into the reservoir rocks 16 on both sides of the fault core, and a perforation section 15 is created towards the fault core located near the bottom of the slurry injection wellbore 14; in which, the slurry injection wellbore 14 is connected to a high-pressure constant-speed pump 6 and a nano-microsphere slurry tank 13 via pipelines. Furthermore, the first monitoring well 18, the second monitoring well 19, the water leakage holes at the four corners of the rock bracket, and the water leakage hole at the center of the rock bracket are respectively connected to independent liquid collectors 25 via pipelines.

Figure 6:
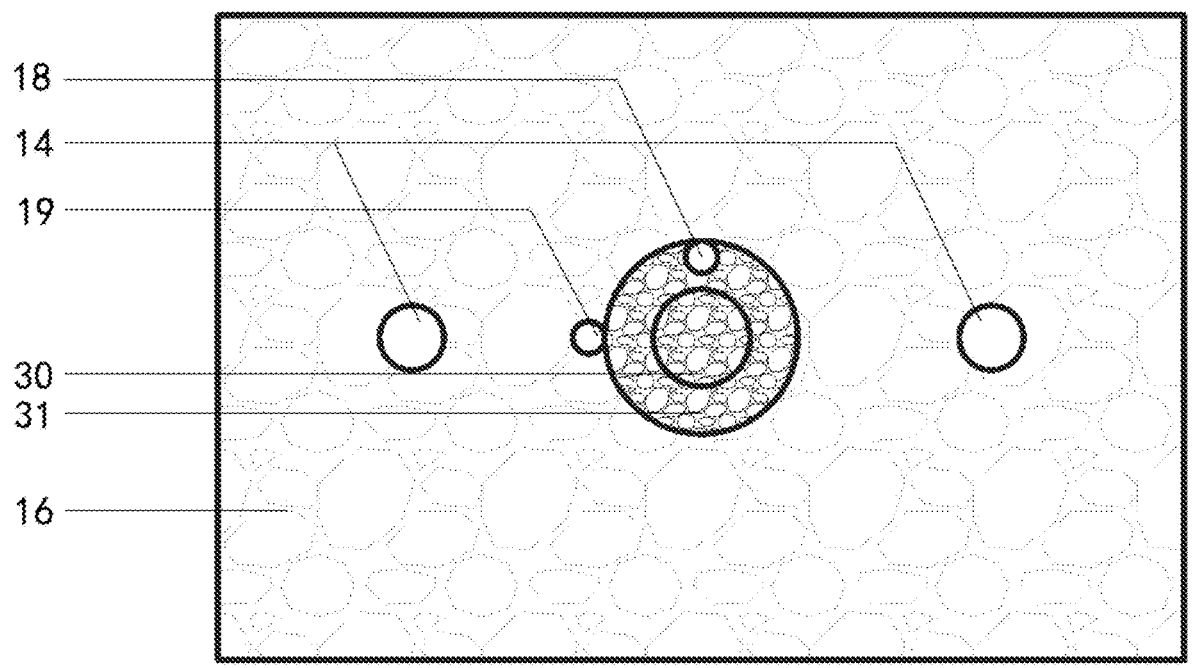
FIG. 6 is a schematic plan view of reservoir rocks and the arrangement of monitoring wells.

Specifically, as shown in FIG. 6, acquire a site reservoir rock 16, cut it into a cuboid with a size of 300 mm×200 mm×100 mm, and place it in the rock bracket 28. The rock bracket 28 is placed on a support with casters 29 at the bottom to facilitate flexible operation during experiments; a round through-hole with a radius of 30 mm is drilled at the center of the reservoir rock 16, and a fault filling zone model is added inward to simulate the fault core. The fault core is divided into two zones along the inner diameter (only for conceptual distinction), the zone with a radius less than 15 mm is an inner zone 30 of the fault zone filler, and the zone with a radius greater than 15 mm is an outer zone 31 of the fault zone filler. A first monitoring well 18, with a radius of 5 mm and a depth of 20 mm, is provided near the edge of the reservoir rock 16 in the outer zone 31 of the fault zone filler, while a second monitoring well 19 with the same size is located on the side of the reservoir rock 16. The specific positions are as shown in FIG. 6. A slurry injection wellbore 14 with a radius of 10 mm and a depth of 60 mm is drilled on both sides of the reservoir rock 16. Perforation treatment is performed in the direction of the fault core, 50 mm away from the upper surface of the reservoir rock 16 within the slurry injection wellbore 14. Subsequently, a slurrying pipe is placed in the slurry injection wellbore 14. The nano-microsphere infused slurry is then injected into the reservoir rock 16 through the slurrying pipe at a constant flow rate v, and migrates along the perforation section 15 into the fault core.

Figure 7:
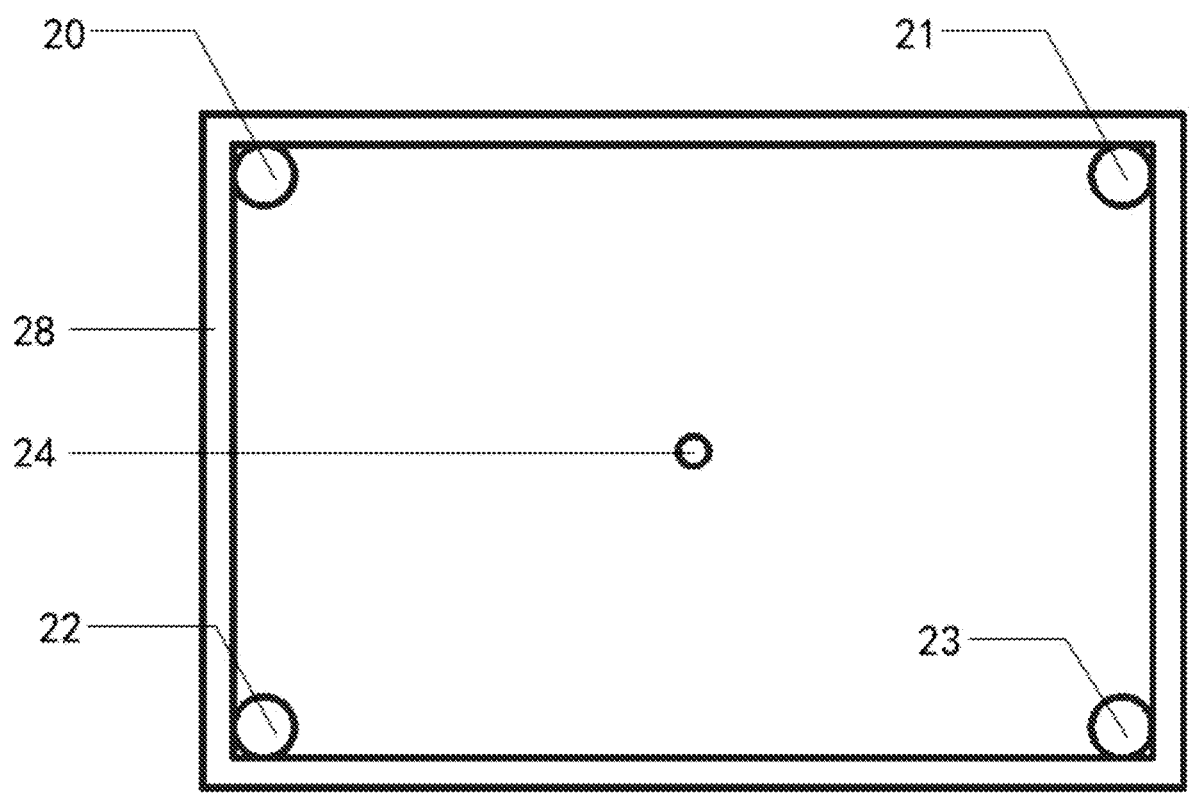
FIG. 7 is a schematic plan view of the rock bracket.

As shown in FIG. 7, round holes with a radius of 10 mm are arranged at four corners of the rock bracket 28 to serve as flow channels for fluid, while a round hole with a radius of 5 mm is arranged at the center of the rock bracket 28 to serve as a flow channel. The fluid is collected after flowing through these round holes to facilitate the evaluation of the process of displacing the original pore water during migration of the nano-microsphere infused slurry.

For instance, in the device for making a physical fault model and empirically evaluating its sealing performance provided by an embodiment, as shown in FIG. 5, each of the liquid collectors 25 is placed on a balance 26. The concentration of nano-microspheres in the liquid collected by each liquid collector 25 is measured using a liquid composition detector 27. During the slurrying process, the liquid composition detector 27 continuously monitors the concentration of nano-microspheres in the liquid flowing from the monitoring wells. By combing this data with the initially set slurrying flow rate, the mass of both water and nano-microspheres retained in the rock mass during slurrying can be determined.

A second aspect of the present application provides a method for making a physical fault model and empirically evaluating its sealing performance, comprising:

S1 preparing a fault filling zone model using a sample-making mold, specifically comprising:

S1.1 collecting a filler from a fault zone at the site and determining its main physical parameters in a laboratory, comprising moisture content, composition, grain gradation, compactness and density, etc.;

S1.2 taking an appropriate amount of the fault zone filler, measuring its initial mass $m_0$, adding an appropriate amount of water to achieve a plastic state that facilitates subsequent filling compression and measuring a mass $m_1$ of the fault zone filler after the addition of water;

S1.3 before making a sample, measuring a mass $m_2$ of the sample-making mold; filling the fault zone filler into the sample-making mold to prepare a fault filling zone model to ensure that the compactness of the sample remains unchanged before and after filling; calculating a corresponding sample volume under the condition that the compactness remains unchanged, based on the compactness and moisture content of the fault zone filler measured in the S1.1 so as to determine a compaction depth h of the squeeze rod 3; after the squeeze rod 3 is slowly advanced to the specified compaction depth h, removing the squeeze rod 3 and measuring the total mass $m_3$ of the fault zone filler and the sample-making mold at this time; and S1.4 drying the sample at a low temperature, continuously monitoring the mass of the sample during the drying process, and when the mass drops from $m_3$ to $m_0+m_2$, indicating that the moisture content of the sample has returned to its pre-filling state, stopping the drying process to ensure consistency in moisture content before and after filling; opening the mold buckle 2, removing the bottom cover 4, cutting the sample along the connection between the two sleeve columns, and dividing it into two sections; and taking one section to complete the modeling of the fault filling zone;

S2 using a permeability test device to examine the initial permeability $K_1$ of the fault filling zone model prior to sealing it with a nano-microsphere infused slurry, specifically comprising:

S2.1 installing permeability test caps 5 at both the upper and lower ends of the fault filling zone model;

S2.2 connecting the fault filling zone model with permeability test caps 5 installed to a permeability test device; and S2.3 maintaining a constant water flow rate during the test, recording data once the flow and pressure data at the upper and lower ends of the fault filling zone model are stabilized, and calculating an initial permeability $K_1$ of the fault filling zone model prior to sealing it with a nano-microsphere infused slurry;

S3 placing the fault filling zone model into reservoir rocks, drilling slurry injection wellbores in the reservoir rocks on both sides of the fault filling zone model, creating a perforation section near a bottom of the slurry injection wellbore directed towards the fault filling zone model, and injecting the nano-microsphere infused slurry into the slurry injection wellbore to perform a sealing experiment with a nano-microsphere infused slurry using a nano-microsphere slurrying experimental system, which specifically comprising:

S3.1 preparing a nano-microsphere infused slurry: preparing polymer nano-microspheres with a particle diameter of 60 nm by an inverse microemulsion polymerization with acrylamide configured as monomers, and then adding water, as a solvent, to prepare the nano-microsphere infused slurry; wherein these polymer nano-microspheres have advantages such as small size, adjustable particle size and fast polymerization reaction time; due to their small size, they can migrate, driven by pressure difference, to target areas that need sealing, such as fault junctions and the interiors of faults; in these areas, the pressure is relatively low, allowing the nano-microspheres to be trapped and expanded in the pores, effectively sealing faults in underground gas storages;

S3.2 acquiring reservoir rocks from the site, drilling perforations at a center of the reservoir rocks to make a fault filling zone model that simulates a fault core; drilling a first monitoring well 18 with a shallow buried depth in the fault core located near an edge of the reservoir rocks and further a second monitoring well 19 with a shallow buried depth within the reservoir rocks; drilling slurry injection wellbores within the reservoir rocks on both sides of the fault core, and creating a perforation section directed towards the fault core near the bottom of the slurry injection wellbore; injecting the nano-microsphere infused slurry into the slurry injection wellbore, and allowing the slurry to migrate through the perforation section towards the fault core;

S3.3 continuously detecting the content of nano-microspheres in the liquid flowing from the first monitoring well 18 and the second monitoring well 19 using a liquid composition detector so as to quantify the mass of water and nano-microspheres retained within the rock mass during the slurrying process; when nano-microspheres are detected in the solution discharged from the first monitoring well 18, indicating that the nano-microspheres have migrated to the fault; if the concentration of nano-microspheres in the fluid discharged from the flow channel formed by the water leakage holes of the first monitoring well 18, the second monitoring well 19 and at the four corners and the center of the reservoir rock 16 remains stable, stopping the slurrying operation; and S3.4 standing still for 48 hours until the nano-microspheres are fully expanded, crystallized and polymerized;

S4 extracting the fault filling zone model after the slurrying process in the S3, and repeating the S2 to measure the permeability $K_2$ of the model after sealing;

specifically, taking out the fault zone filler with a diameter of 25 mm and a height of 50 mm, repaired by nano-microspheres from an inner zone 30 of the fault zone filler using a sleeve 1, then covering the upper and lower ends with permeability test caps 5 and placing it on the permeability testing device; then repeating the S2 to measure the permeability $K_2$ of the fault core after sealing; and S5 calculating the sealing performance index n of the fault filling zone model using the following equation:

$$\eta = \frac{K_1 - K_2}{K_1} \times 100\%$$

The higher the sealing performance index n, the more effective the sealing performance will be.

To address the technical problem of repairing faults with a high leakage risk in underground gas storages, this application proposes a laboratory evaluation method for achieving fault sealing using nano-microspheres. In the laboratory, a sealing experiment involving the slurrying of nano-microspheres is carried out on a scaled reservoir and fault model. The permeabilities $K_1$ and $K_2$ of the fault filling zone are measured before and after sealing, and the sealing rate is calculated to evaluate the sealing effect of the nano-microsphere slurry. This method provides technical support for designing fault sealing solutions on an actual engineering scale, and provides a basis for developing a fault sealing solution for underground gas storage projects.

For instance, in the method for making a physical fault model and empirically evaluating its sealing performance provided in an embodiment, the fault filling zone models, both extracted and unexacted in the S3 after slurrying, along with the reservoir rocks, undergo directional slice processing at specific intervals. By examining the substances and structural characteristics in thin sections of the rocks at various locations, the migration path, precipitation position of the nano-microsphere infused slurry, and the polymer distribution of these nano-microspheres are observed.

For instance, in the method for making a physical fault model and empirically evaluating its sealing performance provided by an embodiment, the lateral distance between the slurry injection wellbore 14 and the fault filling zone model, along with the slurry flow rate, volume and concentration of nano-microspheres in the slurry, is adjusted during a sealing experiment utilizing nano-microsphere infused slurry in the S3. S3-S5 are repeated, allowing for analyzing the influence of various factors on the fault sealing effect. Ultimately identifying the optimal conditions for sealing. This provides a design basis for the actual sealing of faults in underground gas storage projects.

Although the embodiments of the present application have been disclosed as described above, they are not limited to the applications listed in the specification and the embodiments. They can be completely applied to various fields suitable for this application, and those familiar with the art can readily implement other modifications. Therefore, without deviating from the general concepts defined by the claims and equivalent scope, this application is not limited to specific details and legends shown and described herein.

What is claimed is:

1. A method for making a physical fault model and empirically evaluating its sealing performance, comprising the following steps:

S1 preparing a fault filling zone model using a sample-making mold, comprising the following steps:

S1.1 collecting a fault zone filler from a fault zone at a site and determining its main physical parameters in a laboratory, comprising moisture content, composition, grain gradation, compactness and density;

S1.2 taking an appropriate amount of the fault zone filler, measuring its initial mass $m_0$, adding an appropriate amount of water to achieve a plastic state and measuring a mass $m_1$ of the fault zone filler after the addition of water;

S1.3 recording a mass $m_2$ of the sample-making mold, filling the fault zone filler into the sample-making mold to prepare a fault filling zone model, calculating a corresponding sample volume under a condition that the compactness remains unchanged, based on the compactness and moisture content of the fault zone filler determined in the S1.1 so as to determine a compaction depth h, and recording a total mass $m_3$ of the fault zone filler and the sample-making mold once the compaction depth h is reached; and S1.4 drying a sample at a low temperature, continuously monitoring the mass of the sample during a drying process, and when the mass drops from $m_3$ to $m_0 \pm m_2$, stopping the drying process to complete the fault filling zone model;

wherein the sample-making mold consists of a sleeve, a bottom cover and a squeeze rod; the sleeve is designed to hold the fault zone fillers and comprises two detachably connected sleeve columns; the bottom cover is detachably connected to a base of the sleeve; the squeeze rod comprises a rod body and a squeeze disc attached to one end of the rod body, with the squeeze disc designed to fit an inner diameter of the sleeve;

S2 using a permeability test device to test an initial permeability $K_1$ of the fault filling zone model prior to sealing it with a nano-microsphere infused slurry, comprising the following steps:

S2.1 installing permeability test caps at both the upper and lower ends of the fault filling zone model;

S2.2 connecting the fault filling zone model with permeability test caps installed to the permeability test device; and S2.3 maintaining a constant water flow rate during test, recording data once the flow and pressure data at the upper and lower ends of the fault filling zone model are stabilized, and calculating an initial permeability $K_1$ of the fault filling zone model prior to sealing it with a nano-microsphere infused slurry;

wherein the permeability test device comprises permeability test caps; each of the permeability test caps is detachably connected to an upper and lower ends of the sleeve; one side of the permeability test cap is provided with a plurality of communicating grooves, with each groove containing a series of water leakage through-holes at intervals;

wherein both ends of the sleeve, which is filled with the fault filling zone model, are connected to the permeability test caps to form a testing unit; one end of the testing unit is connected to a high-pressure constant-speed pump and a water tank through pipelines, while the other end of the testing unit is connected to a liquid collection container through additional pipelines; a flow sensor and a pressure sensor are installed on a water inlet pipeline and a water outlet pipeline at the upper and lower ends of the testing unit, respectively, and the flow sensor and the pressure sensor are connected to a screen display device through transmission lines;

S3 placing the fault filling zone model into reservoir rocks, drilling slurry injection wellbores in the reservoir rocks on both sides of the fault filling zone model, creating a perforation section near a bottom of the slurry injection wellbores directed towards the fault filling zone model, and injecting the nano-microsphere infused slurry into the slurry injection wellbores to perform a sealing experiment utilizing a nano-microsphere slurrying experimental system;

wherein the nano-microsphere slurrying experimental system comprises a rock bracket, wherein the reservoir rocks are installed in the rock bracket, and water leakage holes are located at four corners and a center of the rock bracket; perforations are created at the center of the reservoir rocks for filling the fault filling zone model to simulate a fault core; a first monitoring well, with a shallow buried depth, is drilled into the fault core near an edge of the reservoir rocks, and a second monitoring well, also with a shallow buried depth, is drilled within the reservoir rocks; the slurry injection wellbores are drilled into the reservoir rocks on both sides of the fault core, and the perforation section is created towards the fault core located near the bottom of the slurry injection wellbores; and wherein the slurry injection wellbores are connected to a high-pressure constant-speed pump and a nano-microsphere slurry tank via pipelines; furthermore, the first monitoring well, the second monitoring well, the water leakage holes at the four corners of the rock bracket, and the water leakage hole at the center of the rock bracket are respectively connected to independent liquid collectors via pipelines;

S4 extracting the fault filling zone model after a slurrying process in the S3, and repeating S2 comprising S2.1 to S2.3 to measure the permeability $K_2$ of the model after sealing; and S5 calculating the sealing performance index $\eta$ of the fault filling zone model using the following equation:

$$\eta = \frac{K_1 - K_2}{K_1} \times 100\%.$$

2. The method for making a physical fault model and empirically evaluating its sealing performance according to claim 1, wherein the sealing experiment with a nano-microsphere infused slurry in the S3 comprises:

S3.1 preparing a nano-microsphere infused slurry: preparing polymer nano-microspheres with a particle diameter of 40-80 nm by an inverse microemulsion polymerization with acrylamide configured as monomers, and then adding water, as a solvent, to prepare the nano-microsphere infused slurry;

S3.2 acquiring the reservoir rocks from the site, drilling perforations at a center of the reservoir rocks to make a fault filling zone model that simulates a fault core, drilling a first monitoring well with a shallow buried depth in the fault core located near an edge of the reservoir rocks and further a second monitoring well with a shallow buried depth within the reservoir rocks; drilling the slurry injection wellbores within the reservoir rocks on both sides of the fault core, and creating the perforation section directed towards the fault core near the bottom of the slurry injection wellbores; injecting the nano-microsphere infused slurry into the slurry injection wellbores, and allowing the slurry to migrate through the perforation section towards the fault core;

S3.3 continuously monitoring the concentration of nano-microspheres in a liquid flowing from a first monitoring well and a second monitoring well using a liquid composition detector so as to quantify the mass of water and nano-microspheres retained within the rock mass during the slurrying process; when the concentration of nano-microspheres in a discharged liquid from the first monitoring well, the second monitoring well and the reservoir rocks stabilizes, stopping the slurrying process; and S3.4 standing still for 48 hours until the nano-microspheres are fully expanded, crystallized and polymerized.

3. The method for making a physical fault model and empirically evaluating its sealing performance according to claim 1, wherein the fault filling zone models and the rocks in the reservoir are then subjected to a directional slice processing at specified intervals; a migration path and a precipitation position of the nano-microsphere infused slurry and a polymer distribution of nano-microspheres are observed by examining the substances and structural characteristics in thin casting sections of the rocks at different positions.

4. The method for making a physical fault model and empirically evaluating its sealing performance according to claim 1, wherein a lateral distance between the slurry injection wellbores and the fault filling zone model, a slurry flow rate, a slurry flow volume and a concentration of nano-microspheres in a slurry during a sealing experiment with the nano-microsphere infused slurry in the S3 are adjusted; and S3 to S5 are repeated, allowing for analysis of various factors affecting fault sealing effectiveness.

* * * * *